United States Patent
AlYousif et al.

(10) Patent No.: US 10,793,767 B2
(45) Date of Patent: Oct. 6, 2020

(54) STABILIZED FOAMS WITH TAILORED WATER CHEMISTRY FOR MOBILITY CONTROL IN GAS INJECTION PROCESSES

(71) Applicant: Saudi Arabian Oil Company, Dhahran (SA)

(72) Inventors: Zuhair AlYousif, Saihat (SA); Subhash Ayirala, Dhahran (SA); Mustafa Alkhowaildi, Safwa (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/203,729

(22) Filed: Nov. 29, 2018

(65) Prior Publication Data

US 2020/0172795 A1    Jun. 4, 2020

(51) Int. Cl.
*C09K 8/594* (2006.01)
*E21B 43/16* (2006.01)
*C09K 8/584* (2006.01)

(52) U.S. Cl.
CPC ............. *C09K 8/594* (2013.01); *C09K 8/584* (2013.01); *E21B 43/166* (2013.01)

(58) Field of Classification Search
None
See application file for complete search history.

(56) References Cited

U.S. PATENT DOCUMENTS

| | | | |
|---|---|---|---|
| 5,706,895 A | 1/1998 | Sydansk | |
| 5,711,376 A | 1/1998 | Sydansk | |
| 6,063,738 A * | 5/2000 | Chatterji | C04B 24/12 507/269 |
| 6,367,550 B1 * | 4/2002 | Chatterji | C04B 24/14 166/293 |
| 6,689,325 B2 | 2/2004 | Althausen et al. | |
| 6,800,592 B2 | 10/2004 | Rojas et al. | |
| 6,979,701 B2 | 12/2005 | Kaneda et al. | |
| 8,950,494 B2 | 2/2015 | Nguyen et al. | |
| 9,695,353 B2 | 7/2017 | Nelson et al. | |
| 10,150,905 B1 * | 12/2018 | Reddy | C04B 9/00 |
| 2002/0005287 A1 * | 1/2002 | Reddy | C04B 28/02 166/295 |
| 2008/0105167 A1 * | 5/2008 | Santra | C04B 9/04 106/691 |
| 2011/0196055 A1 | 8/2011 | Kramer et al. | |
| 2016/0333160 A1 | 11/2016 | Bertucelli et al. | |

(Continued)

FOREIGN PATENT DOCUMENTS

WO    2012158489 A2    11/2012
WO    2013184116 A1    12/2013

OTHER PUBLICATIONS

International Search Report and Written Opinion dated Nov. 21, 2019 pertaining to International application No. PCT/US2019/052109 filed Sep. 20, 2019.

(Continued)

*Primary Examiner* — John J Figueroa
(74) *Attorney, Agent, or Firm* — Dinsmore & Shohl LLP (57) ABSTRACT

The application discloses foam compositions, methods to produce foam compositions, and methods to increase hydrocarbon production by displacing a hydrocarbon product with a foam composition. The foam composition includes an aqueous phase that typically includes an amphoteric surfactant and inorganic ions.

18 Claims, 4 Drawing Sheets

(56) References Cited

U.S. PATENT DOCUMENTS

2016/0347990 A1    12/2016   Vanzin et al.
2018/0244973 A1*   8/2018   Miller .................. E21B 21/065

OTHER PUBLICATIONS

Espinosa et al., "Nanoparticle-Stabilized Supercritical Co2 Foams for Potential Mobility Control Applications", SPE Interational 129925, 2010.
Liu et al., "Salinity, pH and Surfactant Concentration Effects on CO2 Foam", SPE International 93095, 2005.
Singh et al., "Foams Stabilized by In-Situ Surface Activated Nanoparticles in Bulk and Porous Media", SPE International, 170942-MS, 2014.
Singh et al., "Synergistic Stabilization of Foams by a Mixture of Nanoparticles and Surfactants", SPE International 169126-MS, 2014.
Alyousef et al., "The effect of nanoparticle aggregation on surfactant foam stability", Journal of Colloid and Interface Science, vol. 511, pp. 365-373, 2018.
Alyousef et al., "Enhancing the Stability of Foam by the Use of Nanoparticles", Energy Fuels, American Chemical Society, 10:24:04/8/JCA-Default, Sep. 7, 2017.
Zhu et al., "Studies on Nanoparticle-Stabilized Foam Flooding EOR for a High Temperature and High Salinity Reservoir", SPE International 188964-MS, 2017.

* cited by examiner

STABILIZED FOAMS WITH TAILORED WATER CHEMISTRY FOR MOBILITY CONTROL IN GAS INJECTION PROCESSES

TECHNICAL FIELD

Embodiments of the present disclosure generally relate to compositions and methods utilized in natural resource wells and, more specifically, to fluids used to increase hydrocarbon production rates.

BACKGROUND

The discovery and extraction of hydrocarbons, such as crude oil or natural gas, from subterranean formations may be impeded for a variety of reasons, such as inherently poor permeability or damage to the formation. The production rate of hydrocarbons from a hydrocarbon-producing region of the formation may be reduced compared to the expected production rate. In these instances, methods for obtaining enhanced oil recovery from the hydrocarbon-producing regions of the formation can be utilized to improve hydrocarbon production. Enhanced Oil Recovery (EOR) methods may include chemical flooding of the formation using alkaline or micellar-polymer, miscible displacement of the hydrocarbons left in pore space using carbon dioxide injection or hydrocarbon injection, and thermal recovery using steamflood or in situ combustion.

SUMMARY

Foams present a promising strategy to displace hydrocarbons within an underground rock formation. The stabilization of foam under reservoir conditions is a major challenge. The harsh reservoir conditions, such as high temperature and high brine salinity relative to standard temperature and fresh-water, respectively, together with surfactant adsorption on the rock may result in unstable foam and, consequently, poor sweep efficiency.

Foams can be generated by mixing an injection gas with injection water containing surfactant. The injection of alternate slugs of gas and injection water with surfactant generates in situ foam in the reservoir. The typical high salinity injection waters (such as seawater) used in the field for in situ foam generation often results in poor foam stability. Accordingly, there is a continual need for improved foam stability.

The embodiments described in the present disclosure meet this need by utilizing tailored water chemistry (formulated low-salinity water) to allow the generation of a stable solution displaying improved foam stability.

Various aspects of the disclosure relate to a method of extracting a hydrocarbon product from a reservoir. The method may include combining an aqueous liquid and a gas vehicle, thereby producing a foam; introducing the foam to the reservoir such that the hydrocarbon product in the reservoir is displaced; and collecting the displaced hydrocarbon product. The aqueous liquid may include inorganic ions at a total concentration of 1 g/L to 9 g/L; surfactants at a total concentration of 100 mg/L to 10 g/L; and total dissolved solids at a concentration of 2 g/L to 20 g/L. The density of the foam at atmospheric pressure may be 100 g/L to 750 g/L.

The term "g/L" is an abbreviation for grams per liter.

The aqueous liquid may include inorganic ions at a total concentration of 5 g/L to 8 g/L. The aqueous liquid may include sodium cation at a concentration of at least 500 mg/L; chloride anion at a concentration of at least 1 g/L; magnesium cation at a concentration of at least 100 mg/L; or sulfate anion at a concentration of at least 250 mg/L. For example, the aqueous liquid may include sodium cation at a concentration of 1 g/L to 4 g/L; chloride anion at a concentration of 2 g/L to 5 g/L; magnesium cation at a concentration of 150 mg/L to 300 mg/L; or sulfate anion at a concentration of 300 mg/L to 600 mg/L. The aqueous liquid may include calcium cation at a concentration of 50 mg/L to 100 mg/L.

The term "mg/L" is an abbreviation for milligrams per liter.

The surfactants may include one or more amphoteric surfactants. The surfactants may include one or more anionic, cationic, or nonionic surfactants. The surfactants may include one or more N-alkyl amine oxide surfactants. The surfactants may include one or more amphoteric alkyl amine surfactants. The surfactants may include one or more hydroxysultaine surfactants.

The surfactants may include one or more of lauramidopropylamine oxide, myristamidopropylamine oxide, and cocamidopropyl hydroxysultaine.

The method may further include combining a tailored water with the surfactants, thereby producing the aqueous liquid, in which the tailored water includes inorganic ions at a concentration of at least 1 g/L.

The method may further include combining seawater and an aqueous vehicle, thereby producing the tailored water. For example, the aqueous vehicle may be desalinated seawater, ground water, formation water, water of an aquifer, or surface water; and the seawater and aqueous vehicle may be combined at a ratio (volume:volume) of 1:5 to 1:20 such as 1:7 to 1:15.

The method may further include desalinating seawater to produce desalinated seawater. The tailored water may be desalinated seawater or the tailored water may be produced by combining desalinated seawater with another aqueous liquid.

The method may further include pumping the aqueous liquid into the reservoir or pumping the foam into the reservoir.

The gas vehicle may include air, nitrogen, or carbon dioxide, for example, at a total concentration of at least 70% by volume.

The reservoir may be an underground rock formation that includes crude oil or natural gas.

Various aspects of the disclosure relate to a foam composition including an aqueous liquid and pockets of gas within the aqueous liquid. The aqueous liquid may include, for example, sodium cation at a concentration of 1 g/L to 4 g/L; chloride anion at a concentration of 2 g/L to 5 g/L; magnesium cation at a concentration of 150 mg/L to 300 mg/L; sulfate anion at a concentration of 300 mg/L to 600 mg/L; calcium cation at a concentration of 50 mg/L to 100 mg/L; inorganic ions at a total concentration of 5 g/L to 8 g/L; amphoteric surfactants at a total concentration of 100 mg/L to 10 g/L; and total dissolved solids at a concentration of 6 g/L to 18 g/L. The density of the foam at atmospheric pressure may be, for example, 100 g/L to 750 g/L.

Additional features and advantages of the described embodiments are set forth in the detailed description that follows and will be readily apparent to those skilled in the art or otherwise recognized by practicing the described embodiments included in the detailed description and claims.

BRIEF DESCRIPTION OF THE DRAWINGS

The following detailed description of the illustrative embodiments can be understood when read in conjunction with the following drawings.

DETAILED DESCRIPTION

Various aspects of the disclosure relate to the finding that a composition including specific amounts of ions generates superior foam compositions when combined with a range of surfactants (for example, amphoteric surfactants) in aqueous solution. These foams may be injected into or produced within a subterranean reservoir to displace subterranean hydrocarbons and thereby increase the production rate of the reservoir.

A foam composition of the disclosure typically includes a gas vehicle and an aqueous liquid. The aqueous liquid is typically prepared by combining a tailored water with surfactant(s). "Tailored" water is human-made water that generally has inorganic ion concentrations that are both greater than tap water and less than seawater. An example of tailored water has ion concentrations that are approximately one-tenth of the ion concentrations of seawater. The ranges of solute concentrations present in a tailored water are limited primarily by the ranges of solute concentrations desired in an aqueous liquid.

The nature of the gas vehicle is not particularly limiting. The gas vehicle may be, for example, air, nitrogen, or carbon dioxide. The gas vehicle may include at least 70%, 80%, or 90% nitrogen by volume. The gas vehicle may include at least 10%, 20%, 30%, 40%, 50%, 60%, 70%, 80%, or 90% carbon dioxide by volume.

An aqueous liquid includes water and solutes in which the solutes include surfactants and inorganic ions.

The ions of an aqueous liquid typically include inorganic ions. The term "inorganic ion" refers to a charged molecule that lacks a covalent bond between a carbon atom and a hydrogen atom (lacking any C—H bond), except that the term does not include protons, hydronium, hydroxide, and other ions that consist solely of hydrogen or oxygen atoms.

An aqueous liquid may include inorganic ions at a concentration of 0.5 g/L to 25 g/L, such as 0.5 g/L to 20 g/L, 0.5 g/L to 15 g/L, 0.5 g/L to 10 g/L, 0.5 g/L to 9 g/L, 1 g/L to 25 g/L, 1 g/L to 20 g/L, 1 g/L to 15 g/L, 1 g/L to 10 g/L, 1 g/L to 9 g/L, 0.5 g/L to 5 g/L, 0.6 g/L to 6 g/L, 0.7 g/L to 7 g/L, 0.8 g/L to 8 g/L, 0.9 g/L to 9 g/L, 1 g/L to 11 g/L, 2 g/L to 12 g/L, 3 g/L to 13 g/L, 4 g/L to 14 g/L, 5 g/L to 15 g/L, 6 g/L to 16 g/L, 1 g/L to 6 g/L, 2 g/L to 6 g/L, 3 g/L to 6 g/L, 4 g/L to 6 g/L, 5 g/L to 6 g/L, 1 g/L to 7 g/L, 2 g/L to 7 g/L, 3 g/L to 7 g/L, 4 g/L to 7 g/L, 5 g/L to 7 g/L, 6 g/L to 7 g/L, 1 g/L to 8 g/L, 2 g/L to 8 g/L, 3 g/L to 8 g/L, 4 g/L to 8 g/L, 5 g/L to 8 g/L, 6 g/L to 8 g/L, 7 g/L to 8 g/L, 1 g/L to 9 g/L, 2 g/L to 9 g/L, 3 g/L to 9 g/L, 4 g/L to 9 g/L, 5 g/L to 9 g/L, 6 g/L to 9 g/L, or 7 g/L to 9 g/L. In certain embodiments, the aqueous liquid includes inorganic ions at a concentration of 5 g/L to 7 g/L.

The ions of an aqueous liquid typically include monoatomic ions. The term "monoatomic ion" refers to an ion consisting of a single atom, except that the term does not include protons.

An aqueous liquid may include monoatomic ions at a concentration of 0.5 g/L to 25 g/L, such as 0.5 g/L to 20 g/L, 0.5 g/L to 15 g/L, 0.5 g/L to 10 g/L, 0.5 g/L to 9 g/L, 1 g/L to 25 g/L, 1 g/L to 20 g/L, 1 g/L to 15 g/L, 1 g/L to 10 g/L, 1 g/L to 9 g/L, 0.5 g/L to 5 g/L, 0.6 g/L to 6 g/L, 0.7 g/L to 7 g/L, 0.8 g/L to 8 g/L, 0.9 g/L to 9 g/L, 1 g/L to 11 g/L, 2 g/L to 12 g/L, 3 g/L to 13 g/L, 4 g/L to 14 g/L, 5 g/L to 15 g/L, 6 g/L to 16 g/L, 1 g/L to 6 g/L, 2 g/L to 6 g/L, 3 g/L to 6 g/L, 4 g/L to 6 g/L, 5 g/L to 6 g/L, 1 g/L to 7 g/L, 2 g/L to 7 g/L, 3 g/L to 7 g/L, 4 g/L to 7 g/L, 5 g/L to 7 g/L, 6 g/L to 7 g/L, 1 g/L to 8 g/L, 2 g/L to 8 g/L, 3 g/L to 8 g/L, 4 g/L to 8 g/L, 5 g/L to 8 g/L, 6 g/L to 8 g/L, 7 g/L to 8 g/L, 1 g/L to 9 g/L, 2 g/L to 9 g/L, 3 g/L to 9 g/L, 4 g/L to 9 g/L, 5 g/L to 9 g/L, 6 g/L to 9 g/L, or 7 g/L to 9 g/L. In certain embodiments, the aqueous liquid includes monatomic ions at a concentration of 5 g/L to 7 g/L.

The ions of an aqueous liquid typically include polyatomic inorganic ions. The term "polyatomic inorganic ion" refers to an inorganic ion consisting of at least two atoms and including at least one covalent bond. The term does not include hydronium, hydroxide, and other ions that consist solely of hydrogen or oxygen atoms.

An aqueous liquid may include polyatomic inorganic ions at a concentration of 10 mg/L to 5 g/L such as 10 mg/L to 1 g/L, 10 mg/L to 500 mg/L, 50 mg/L to 5 g/L, 50 mg/L to 1 g/L, 100 mg/L to 5 g/L, 100 mg/L to 1 g/L, 200 mg/L to 5 g/L, 200 mg/L to 1 g/L, 50 mg/L to 500 mg/L, 60 mg/L to 600 mg/L, 70 mg/L to 700 mg/L, 80 mg/L to 800 mg/L, 90 mg/L to 900 mg/L, 100 mg/L to 1 g/L, 200 mg/L to 2 g/L, 300 mg/L to 3 g/L, 400 mg/L to 4 g/L, 500 mg/L to 5 g/L, 100 mg/L to 500 mg/L, 200 mg/L to 600 mg/L, 300 mg/L to 700 mg/L, 400 mg/L to 800 mg/L, 500 mg/L to 900 mg/L, or 600 mg/L to 1 g/L.

Sodium ion ($Na^+$) is an inorganic ion and a monoatomic ion. The term "sodium" refers to sodium ion. An aqueous liquid may include sodium at a concentration of 0.2 g/L to 10 g/L such as 0.2 g/L to 5 g/L, 0.2 g/L to 2 g/L, 0.5 g/L to 10 g/L, 0.5 g/L to 5 g/L, 0.5 g/L to 2 g/L, 0.3 g/L to 3 g/L, 0.4 g/L to 4 g/L, 0.5 g/L to 5 g/L, 0.6 g/L to 6 g/L, 0.7 g/L to 7 g/L, 0.8 g/L to 8 g/L, 0.9 g/L to 9 g/L, 1 g/L to 10 g/L, 0.5 g/L to 2.5 g/L, 1 g/L to 3 g/L, 1.5 g/L to 3.5 g/L, or 2 g/L to 4 g/L.

Chloride ion ($Cl^-$) is an inorganic ion and a monoatomic ion. The term "chloride" refers to chloride ion. An aqueous liquid may include chloride at a concentration of 0.2 g/L to 20 g/L such as 0.2 g/L to 15 g/L, 0.2 g/L to 10 g/L, 0.2 g/L to 5 g/L, 0.5 g/L to 20 g/L, 0.5 g/L to 15 g/L, 0.5 g/L to 10 g/L, 0.5 g/L to 5 g/L, 1 g/L to 20 g/L, 1 g/L to 15 g/L, 1 g/L to 10 g/L, 1 g/L to 5 g/L, 0.3 g/L to 3 g/L, 0.4 g/L to 4 g/L, 0.5 g/L to 5 g/L, 0.6 g/L to 6 g/L, 0.7 g/L to 7 g/L, 0.8 g/L to 8 g/L, 0.9 g/L to 9 g/L, 1 g/L to 10 g/L, 2 g/L to 12 g/L, 3 g/L to 13 g/L, 1 g/L to 5 g/L, 2 g/L to 6 g/L, or 3 g/L to 7 g/L.

In certain embodiments, the aqueous liquid includes sodium ion and chloride ion at a combined total concentration of 5 g/L to 7 g/L. In certain embodiments, the aqueous liquid includes sodium ion and chloride ion at a combined total concentration of 5 g/L to 7 g/L and a molar ratio of sodium ion and chloride ion of 1:2 to 2:1 such as 2:3 to 3:2, 3:4 to 4:3, or 4:5 to 5:4.

Magnesium ion ($Mg^{2+}$) is an inorganic ion and a monoatomic ion. The term "magnesium" refers to magnesium ion. The magnesium concentration of an aqueous liquid is not particularly limiting. In certain embodiments, the aqueous liquid includes magnesium at a concentration of less than 1 g/L such as less than 900 mg/L, less than 800 mg/L, less than 700 mg/L, less than 600 mg/L, less than 500 mg/L, less than 400 mg/L, or less than 300 mg/L. In certain embodiments, the aqueous liquid includes magnesium at a concentration of 10 mg/L to 1 g/L, such as 10 mg/L to 900 mg/L, 10 mg/L to 800 mg/L, 10 mg/L to 700 mg/L, 10 mg/L to 600 mg/L, 10 mg/L to 500 mg/L, 10 mg/L to 400 mg/L, 10 mg/L to 300 mg/L, 50 mg/L to 1 g/L, 50 mg/L to 900 mg/L, 50 mg/L to 800 mg/L, 50 mg/L to 700 mg/L, 50 mg/L to 600 mg/L, 50 mg/L to 500 mg/L, 50 mg/L to 400 mg/L, 50 mg/L to 300 mg/L, 100 mg/L to 1 g/L, 100 mg/L to 900 mg/L, 100 mg/L to 800 mg/L, 100 mg/L to 700 mg/L, 100 mg/L to 600 mg/L, 100 mg/L to 500 mg/L, 100 mg/L to 400 mg/L, or 100 mg/L to 300 mg/L. In certain embodiments, the aqueous liquid includes magnesium at a concentration of 150 mg/L to 300 mg/L.

Calcium ion ($Ca^{2+}$) is an inorganic ion and a monoatomic ion. The term "calcium" refers to calcium ion. The precise calcium concentration of an aqueous liquid is not particularly limiting. In certain embodiments, the aqueous liquid includes calcium at a concentration of less than 500 mg/L, such as less than 400 mg/L, less than 300 mg/L, less than 200 mg/L, or less than 100 mg/L. In certain embodiments, the aqueous liquid includes calcium at a concentration of 5 mg/L to 500 mg/L such as 5 mg/L to 400 mg/L, 5 mg/L to 300 mg/L, 5 mg/L to 200 mg/L, 5 mg/L to 100 mg/L, 10 mg/L to 500 mg/L, 10 mg/L to 400 mg/L, 10 mg/L to 300 mg/L, 10 mg/L to 200 mg/L, 10 mg/L to 100 mg/L, 25 mg/L to 500 mg/L, 25 mg/L to 400 mg/L, 25 mg/L to 300 mg/L, 25 mg/L to 200 mg/L, 25 mg/L to 100 mg/L, 50 mg/L to 500 mg/L, 50 mg/L to 400 mg/L, 50 mg/L to 300 mg/L, 50 mg/L to 200 mg/L, or 50 mg/L to 100 mg/L. In certain embodiments, the aqueous liquid includes calcium at a concentration of 50 mg/L to 100 mg/L.

Sulfate ion ($SO_4^{2-}$) is a polyatomic inorganic ion. The term "sulfate" refers to sulfate ion. The precise sulfate concentration is not particularly limiting. In certain embodiments, the aqueous liquid includes sulfate at a concentration of less than 2 g/L such as less than 1 g/L, less than 900 mg/L, less than 800 mg/L, less than 700 mg/L, less than 600 mg/L, or less than 500 mg/L. In certain embodiments, the aqueous liquid includes sulfate at a concentration of 10 mg/L to 2 g/L such as 10 mg/L to 1 g/L, 50 mg/L to 500 mg/L, 60 mg/L to 600 mg/L, 70 mg/L to 700 mg/L, 80 mg/L to 800 mg/L, 90 mg/L to 900 mg/L, 100 mg/L to 1 g/L, 200 mg/L to 2 g/L, 100 mg/L to 500 mg/L, 200 mg/L to 600 mg/L, 300 mg/L to 700 mg/L, or 400 mg/L to 800 mg/L. In certain embodiments, the aqueous liquid includes sulfate at a concentration of 300 mg/L to 600 mg/L.

Bicarbonate ion ($HCO_3^-$) is a polyatomic inorganic ion. Bicarbonate is a weak acid that exists in increasingly alkaline solutions with increasing amounts of its conjugate base carbonate ($CO_3^{2-}$), which is also a polyatomic inorganic ion. The term "bicarbonate" refers to both bicarbonate and its conjugate base carbonate. The precise bicarbonate concentration is not particularly limiting. The aqueous liquid may include bicarbonate at a concentration of 2 mg/L to 200 mg/L such as 2 mg/L to 100 mg/L, 2 mg/L to 90 mg/L, 2 mg/L to 80 mg/L, 2 mg/L to 70 mg/L, 2 mg/L to 60 mg/L, or 2 mg/L to 50 mg/L.

The aqueous liquid includes surfactants. Surfactants are typically organic molecules. The term "organic" refers to a molecule including at least one covalent bond between a carbon atom and a hydrogen atom (at least one C—H bond). The term "surfactant" refers to a molecule including a hydrophobic group and a hydrophilic group such that the surfactant lessens the surface tension between an aqueous liquid (as presently described) and a gas vehicle (as presently described) when the surfactant is dissolved in the aqueous liquid relative to an otherwise identical aqueous composition that lacks the surfactant. The hydrophobic group typically includes or consists of a hydrocarbon moiety. The hydrophilic group typically includes or consists of a polar moiety (for example, an ether or ethanolamine) or a charge moiety (for example, a carboxylate, sulfate group, or ammonium cation).

The surfactants typically include or consist of amphoteric surfactants. The term "amphoteric" refers to a molecule including either (a) a negative charge and a positive charge, (b) a negative charge and an uncharged Brnsted base moiety (such as an amine), (c) an uncharged Brnsted acid moiety (such as a carboxylic acid) and a positive charge, or (d) an uncharged Brnsted acid moiety (such as a carboxylic acid) and an uncharged Brnsted base moiety (such as an amine).

A surfactant typically includes at least one alkyl group. An alkyl group is typically an unbranched, linear alkane including 4 to 28 carbon atoms. The alkyl group may optionally be further-substituted.

A surfactant that is an amphoteric surfactant optionally exists as a zwitterion in the aqueous liquid. A surfactant that is an amphoteric surfactant optionally has an average net charge with an absolute value of less than 1.0, 0.5, 0.4, 0.3, 0.2, or 0.1 in the aqueous liquid.

A surfactant may optionally exist as a zwitterion in aqueous solution at a pH selected from 2.0 to 11.0. A surfactant may optionally exist as a zwitterion in aqueous solution at a pH of 3.0, 4.0, 5.0, 6.0, 7.0, 8.0, 9.0, or 10.0.

Examples of amphoteric surfactants include sultaine surfactants (for example, CHAPS), hydroxysultaine surfactants (for example, lauramidopropyl hydroxysultaine), N-alkyl aminopropionates (for example, N-coco aminopropionate), N-alkyl iminodipropionates (for example, N-coco iminodipropionate), N-alkyl betaines (for example, laurylamidopropyldimethyl betaine), N-alkyl glycinates (for example, coco glycinate), carboxy glycinates, alkyl imidazolines, alkyl polyamino carboxylates ("APACs," for example, coco APAC, carboxymethyl coco polyaminopriopionate), polyamphocarboxy glycinates, alkylated amino acids (for example, dihydroxyethyl tallow glycinate), and N-alkyl amine oxides.

In certain embodiments, the surfactants include or consist of surfactants selected from N-alkyl amine oxide surfactants, hydroxysultaine surfactants, or N-alkyl betaine surfactants.

The surfactants may include one or more of lauramidopropyl hydroxysultaine, cocamidopropyl hydroxysultaine, oleamidopropyl hydroxysultaine, tallowamidopropyl hydroxysultaine, erucamidopropyl hydroxysultaine, lauryl hydroxysultaine, coco aminopropionate, coco iminodipropionate, lauriminodipropionate, lauramidopropyl betaine, laurylamidopropyldimethyl betaine, cocamidopropyl betaine, (carboxylatomethyl) dimethyltetradecylammonium, coco glycinate, coco APAC, dihydroxyethyl tallow glycinate, myristamine oxide, lauryldimethylamine oxide, lauramidopropylamine oxide, myristamidopropylamine oxide, and coco dimethylamine oxide.

In certain embodiments, the surfactants include or consist of surfactants selected from N-alkyl amidopropyl amine oxide surfactants, alkyl amidopropyl hydroxysultaine surfactants, and alkyl amidopropyl betaine surfactants.

The aqueous liquid typically includes surfactants at a concentration of 50 mg/L to 50 g/L such as 50 mg/L to 40 g/L, 50 mg/L to 30 g/L, 50 mg/L to 20 g/L, 50 mg/L to 10 g/L, 50 mg/L to 9 g/L, 50 mg/L to 8 g/L, 50 mg/L to 7 g/L, 50 mg/L to 6 g/L, 50 mg/L to 5 g/L, 50 mg/L to 4 g/L, 50 mg/L to 3 g/L, 50 mg/L to 2 g/L, 50 mg/L to 1 g/L, 100 mg/L to 10 g/L, 100 mg/L to 9 g/L, 100 mg/L to 8 g/L, 100 mg/L to 7 g/L, 100 mg/L to 6 g/L, 100 mg/L to 5 g/L, 100 mg/L to 4 g/L, 100 mg/L to 3 g/L, 100 mg/L to 2 g/L, 100 mg/L to 1 g/L, 200 mg/L to 10 g/L, 200 mg/L to 9 g/L, 200 mg/L to 8 g/L, 200 mg/L to 7 g/L, 200 mg/L to 6 g/L, 200 mg/L to 5 g/L, 200 mg/L to 4 g/L, 200 mg/L to 3 g/L, 200 mg/L to 2 g/L, 200 mg/L to 1 g/L, 500 mg/L to 10 g/L, 500 mg/L to 9 g/L, 500 mg/L to 8 g/L, 500 mg/L to 7 g/L, 500 mg/L to 6 g/L, 500 mg/L to 5 g/L, 500 mg/L to 4 g/L, 500 mg/L to 3 g/L, 500 mg/L to 2 g/L, or 500 mg/L to 1 g/L.

The density of a foam at atmospheric pressure is typically less than 800 g/L such as less than 750 g/L, 700 g/L, 667 g/L, 650 g/L, or 600 g/L. The density of a foam at atmospheric pressure may be, for example, 80 g/L to 800 g/L such as 100 g/L to 750 g/L, 200 g/L to 700 g/L, or 333 g/L to 667 g/L.

Various aspects of the disclosed methods relate to a method of extracting a hydrocarbon product from a reservoir. The method typically includes (1) combining an aqueous liquid with a gas vehicle, thereby producing a foam, (2) displacing the hydrocarbon product in the reservoir with the foam, and (3) collecting the displaced hydrocarbon product.

The method may include combining the aqueous liquid and gas vehicle either inside or outside the reservoir or a wellbore in communication with the reservoir. In some embodiments, at least 1%, 2%, 3%, 4%, 5%, 10%, 20%, 25%, 30%, 33%, 40%, 50%, 60%, 70%, 75%, or 80% by volume of the gas vehicle that enters the reservoir is contained within the pockets of the foam.

The efficiency of foam production may vary. In some embodiments, at least 10%, 20%, 25%, 30%, 33%, 40%, 50%, 60%, 67%, 70%, 75%, 80%, or 90% by volume of the aqueous liquid that is combined with a gas vehicle is incorporated into a foam.

The method may optionally include combining a tailored water with the surfactants, thereby producing the aqueous liquid. The surfactant(s) may optionally exist in an aqueous solution, called a surfactant solution, prior to combining the surfactant(s) with the tailored water. The method may further include combining a tailored water and a surfactant solution. The tailored water may be combined with a surfactant solution at a ratio (volume:volume) of 1,000:1 to 1:10, depending on the relative concentration of solutes in the tailored water and the surfactant solution and the desired concentration of solutes in the aqueous liquid made such a solution. The tailored water may be combined with a surfactant solution at a ratio (volume:volume) of 500:1 to 1:10, 200:1 to 1:10, 100:1 to 1:10, 50:1 to 1:10, 20:1 to 1:10, or 10:1 to 1:10, such as 10:1, 9:1, 8:1, 7:1, 6:1, 5:1, 4:1, 3:1, 2:1, 3:2, 4:3, 5:4, 1:1, 4:5, 3:4, 2:3, 1:2, 1:3, 1:4, 1:5, 1:6, 1:7, 1:8, 1:9, or 1:10, although the precise ratio is not particularly limiting.

The tailored water typically has solute concentrations that are greater than the aqueous liquid made from the tailored water, although the solute concentrations of some ions may be lesser in the tailored water than in a desired aqueous liquid because a surfactant or surfactant solution may include those ions at a concentration that is greater than the concentration present in the tailored water. Surfactants and surfactant solutions are often supplied, for example, with counterions such as sodium cation.

The method may further include combining seawater and an aqueous vehicle, thereby producing either the tailored water or the aqueous liquid. The method may further include combining brine and an aqueous vehicle, thereby producing the tailored water or the aqueous liquid. The method may further include combining seawater and desalinated seawater, thereby producing the tailored water or the aqueous liquid. When either the tailored water or the aqueous liquid is produced by combining seawater and an aqueous vehicle, the seawater and aqueous vehicle are typically combined at a ratio (volume:volume) of 1:5 to 1:20, depending on the concentration of solutes present in the aqueous vehicle.

The aqueous vehicle may be, for example, desalinated seawater; formation water, which is water from either the reservoir or a nearby subterranean well; water of an aquifer; other groundwater; or surface water. The aqueous vehicle may be treated wastewater obtained from production-related activities at the reservoir, such as produced water. Wastewater may be treated, for example, to at least partially separate the water of the wastewater from suspended solids or hydrocarbons.

The aqueous vehicle may be desalinated seawater, formation water, water of an aquifer, other groundwater, or surface water to which surfactants have been added. The aqueous vehicle may be treated wastewater to which surfactants have been added.

A method may further include pumping an aqueous liquid into the reservoir (prior to producing a foam), or pumping a foam into the reservoir (after producing the foam).

A method may include introducing at least 1,000 cubic feet of the foam into the reservoir such as at least 2,000 cubic feet, 3,000 cubic feet, 4,000 cubic feet, 5,000 cubic feet, 6,000 cubic feet, 7,000 cubic feet, 8,000 cubic feet, 9,000 cubic feet, or 10,000 cubic feet of the foam. The method may include introducing at least 100 cubic meters of the foam into the reservoir such as at least 200 cubic meters, 300 cubic meters, 400 cubic meters, 500 cubic meters, 600 cubic meters, 700 cubic meters, 800 cubic meters, 900 cubic meters, 1,000 cubic meters, 1100 cubic meters, 1200 cubic meters, 1300 cubic meters, 1400 cubic meters, 1500 cubic meters, 1600 cubic meters, 1700 cubic meters, 1800 cubic meters, 1900 cubic meters, 2,000 cubic meters, 2100 cubic meters, 2200 cubic meters, 2300 cubic meters, 2400 cubic meters, or 2500 cubic meters of the foam.

A method may include introducing at least 100,000 cubic feet of the foam into the reservoir such as at least 200,000 cubic feet, 300,000 cubic feet, 400,000 cubic feet, 500,000 cubic feet, 600,000 cubic feet, 700,000 cubic feet, 800,000 cubic feet, 900,000 cubic feet, or 1,000,000 cubic feet of the foam. The method may include introducing at least 1,000 cubic meters of the foam into the reservoir such as at least 2,000 cubic meters, 3,000 cubic meters, 4,000 cubic meters, 5,000 cubic meters, 6,000 cubic meters, 7,000 cubic meters, 8,000 cubic meters, 9,000 cubic meters, 10,000 cubic meters, 11,000 cubic meters, 12,000 cubic meters, 13,000 cubic meters, 14,000 cubic meters, 15,000 cubic meters, 16,000 cubic meters, 17,000 cubic meters, 18,000 cubic meters, 19,000 cubic meters, 20,000 cubic meters, 21,000 cubic meters, 22,000 cubic meters, 23,000 cubic meters, 24,000 cubic meters, or 25,000 cubic meters of the foam.

The hydrocarbon product may be crude oil. A method may increase the rate of production of crude oil from the reservoir by at least 10% relative to the rate of production that results from separately injecting both a comparable mass of the aqueous liquid and a comparable mass of the gas vehicle into the reservoir. For example, the method may increase the rate of production by at least 20%, 25%, 30%, 33%, 40%, 50%, 60%, 70%, 80%, 90%, 100%, 150%, or 200%. The method may increase the rate of production of crude oil from the reservoir by at least 1 barrel per day (bbl/day) relative to the rate of production that results from separately injecting both a comparable mass of the aqueous liquid and a comparable mass of the gas vehicle into the reservoir. For example, the method may increase the rate of production by at least 2, 4, 6, 8, 10, 12, 14, 16, 18, or 20 bbl/day. The method may increase the rate of production of crude oil from the reservoir by at least 0.1 metric tons per day relative to the rate of production that results from separately injecting both a comparable mass of the aqueous liquid and a comparable mass of the gas vehicle into the reservoir. For example, the method may increase the rate of production by at least 0.2, 0.5, 1, 2, 3, 4, 5, 6, 7, 8, 9, or 10 metric tons of crude oil per day.

The hydrocarbon product may be a hydrocarbon gas product, for example, natural gas. A method may increase the rate of production of the hydrocarbon gas product from the reservoir by at least 10% relative to the rate of production that results from separately injecting both a comparable mass of the aqueous liquid and a comparable mass of the gas vehicle into the reservoir. For example, the method may increase the rate of production by at least 20%, 25%, 30%, 33%, 40%, 50%, 60%, 70%, 80%, 90%, 100%, 150%, or 200%. The method may increase the rate of production of the hydrocarbon gas product from the reservoir by at least 1 million cubic feet per day (Mcf/day) relative to the rate of production that results from separately injecting both a comparable mass of the aqueous liquid and a comparable mass of the gas vehicle into the reservoir. For example, the method may increase the rate of production by at least 2, 3, 4, 5, 6, 7, 8, 9, 10, 12, 14, 16, 18, or 20 Mcf/day. The method may increase the rate of production of the hydrocarbon gas product from the reservoir by at least 10,000 cubic meters per day relative to the rate of production that results from separately injecting both a comparable mass of the aqueous liquid and a comparable mass of the gas vehicle into the reservoir. For example, the method may increase the rate of production by at least 20,000, 30,000, 40,000, 50,000, 60,000, 70,000, 80,000, 90,000, 100,000, 200,000, 250,000, or 500,000 cubic meters per day.

The hydrocarbon product may be a hydrocarbon gas condensate product, for example, natural-gas condensate. A method may increase the rate of production of the hydrocarbon gas condensate product from the reservoir by at least 10% relative to the rate of production that results from separately injecting both a comparable mass of the aqueous liquid and a comparable mass of the gas vehicle into the reservoir. For example, the method may increase the rate of production by at least 20%, 25%, 30%, 33%, 40%, 50%, 60%, 70%, 80%, 90%, 100%, 150%, or 200%.

The reservoir is typically a subterranean rock formation. The reservoir typically includes hydrocarbons such as crude oil or natural gas.

The reservoir typically includes at least one wellbore. The term "wellbore" refers to a human-made hole that connects a reservoir to a tank or pipe to recover the hydrocarbon product from the reservoir.

The method may optionally be performed after either the reservoir or a wellbore in communication with the reservoir has produced a hydrocarbon product for at least 6 months such as at least 8, 10, 12, 14, 16, 18, 20, 24, 30, 36, 42, or 48 months.

The method may optionally be performed after the daily production rate of the hydrocarbon product from the reservoir or a wellbore in communication with the reservoir has declined to less than 50% of its peak production rate such as less than 40%, 33%, 30%, 25%, 20%, 15%, or 10%.

The method may optionally be performed after the daily production rate of crude oil from the reservoir or a wellbore in communication with the reservoir has declined to less than 20 bbl/day such as less than 18 bbl/day, 16 bbl/day, 14 bbl/day, 12 bbl/day, 10 bbl/day, 8 bbl/day, 6 bbl/day, 5 bbl/day, 4 bbl/day, 3 bbl/day, 2 bbl/day, or 1 bbl/day. The method may optionally be performed after the daily production rate of crude oil from the reservoir or a wellbore in communication with the reservoir has declined to less than 10 metric tons/day such as less than 9 metric tons/day, 8 metric tons/day, 7 metric tons/day, 6 metric tons/day, 5 metric tons/day, 4 metric tons/day, 3 metric tons/day, 2 metric tons/day, 1 metric tons/day, 0.5 metric tons/day, 0.2 metric tons/day, or 0.1 metric tons/day.

The method may optionally be performed after the daily production rate of a hydrocarbon gas product from the reservoir or a wellbore in communication with the reservoir has declined to less than 100 million cubic feet per day (Mcf/day) such as less than 80 Mcf/day, 70 Mcf/day, 60 Mcf/day, 50 Mcf/day, 40 Mcf/day, 30 Mcf/day, 20 Mcf/day, 10 Mcf/day, 9 Mcf/day, 8 Mcf/day, 7 Mcf/day, 6 Mcf/day, 5 Mcf/day, 4 Mcf/day, 3 Mcf/day, 2 Mcf/day, 1 Mcf/day, 0.8 Mcf/day, 0.6 Mcf/day, 0.4 Mcf/day, or 0.2 Mcf/day. The method may optionally be performed after the daily production rate of a hydrocarbon gas product from the reservoir or a wellbore in communication with the reservoir has declined to less than 5,000,000 cubic meters per day such as less than 4,000,000, 3,000,000, 2,000,000, 1,000,000, 900,000, 800,000, 700,000, 600,000, 500,000, 400,000, 300,000, 200,000, 100,000, 75,000, 50,000, 25,000, or 10,000 cubic meters per day.

A foam produced as presently described is typically more stable than a reference foam generated by combining a reference aqueous liquid and a gas vehicle, in which the reference aqueous liquid is produced by combining (1) reference water selected from one of seawater, desalinated seawater, brine, formation water, produced water, surface water, deionized waster, and water including less than 1,000 mg/L inorganic ions such as less than 900, 800, 700, 600, 500, 400, 300, 200, or 100 mg/L inorganic ions (for example, tap water); and (2) surfactant, such that the combination does not dilute the concentration of inorganic ions in the reference water by more than 50%. The term "brine" refers to water that has both a greater sodium ion concentration than seawater and a greater chloride ion concentration than seawater. The term "formation water" refers to water recovered from the reservoir. The term, "surface water" refers to the water of a freshwater lake, pond, river, or stream near a wellbore in communication with the reservoir, for example, within 100, 75, 50, 25, 10, 5, 2, or 1 miles of the wellbore or within 100, 75, 50, 25, 10, 5, 2, or 1 kilometers of the wellbore.

Relative stability may be determined, for example, by monitoring the lifetime of the foam, optionally after subjecting the foam to elevated temperature or pressure. In one or more embodiments, a foam is produced that is more stable than a reference foam, as determined by lifetime, by at least 10% such as at least 20%, 25%, 30%, 33%, 40%, or 50%. The foam may have an average lifetime that is at least 5 minutes longer than the reference foam such as at least 10, 15, 20, 30, 45, or 60 minutes longer.

Relative stability may be determined by measuring the amount of an inert gas that the foam can displace, optionally after subjecting the foam to elevated temperature or pressure. In one or more embodiments, a foam produced as presently described is more stable than a reference foam, as determined by the displacement of an inert gas, by at least 10% such as at least 20%, 25%, 30%, 33%, 40%, or 50%, which means that the foam can displace at least 10% more of the inert gas, such as at least 20%, 25%, 30%, 33%, 40%, or 50% more of the inert gas, than the same amount by mass of the reference foam.

In certain embodiments, the foam lacks any polymer at a concentration greater than 100 mg/L, 500 mg/L, 1 g/L, 2 g/L, 5 g/L, or 10 g/L; or the foam lacks any nanoparticle at a concentration greater than 10 mg/L, 20 mg/L, 30 mg/L, 40 mg/L, 50 mg/L, 75 mg/L, 100 mg/L, 200 mg/L, 500 mg/L, 800 mg/L, or 1 g/L. The term "polymer" refers to the dictionary definition of the term. Three dictionary definitions of "polymer" follow, and the term "polymer" can be construed to include each of these definitions.

1. a compound of high molecular weight derived either by the addition of many smaller molecules, as polyethylene, or by the condensation of many smaller molecules with the elimination of water, alcohol, or the like, as nylon.
2. a compound formed from two or more polymeric compounds.
3. a product of polymerization.

To the extent that the foregoing definitions lack adequate precision, a polymer according to the specification is (a) a molecule including at least 4, 5, 6, 7, or 8 concatenated subunits, in which (b) each of the concatenated subunits is covalently bound to either 1 or 2 other subunits; (c) each subunit is a different group of covalently-linked atoms that occur in the polymer; (d) the types of atoms (for example, carbon, hydrogen, oxygen) in each subunit are identical to the types of atoms in every other subunit; (e) each subunit has identical connectivity and bonding patterns between the covalently-linked atoms of the subunit; (f) each subunit includes at least three atoms other than hydrogen; (g) each subunit includes either (1) an atom other than carbon and hydrogen, or (2) an atom that is covalently bound to at least three atoms other than hydrogen; (h) the at least three atoms optionally includes a linking atom that is not an atom of a given subunit; (i) any linking atom optionally occurs in a different subunit; and (j) any linking atom is of the same type (for example, carbon) for each subunit.

The methods described in the present disclosure are not methods of hydraulic fracturing and do not increase the average pressure inside the reservoir by greater than 1%. For example, the disclosed methods may not increase the pressure inside the reservoir by more than 5, 10, 20, 25, 30, 40, or 50 pounds per square inch (psi) or more than 0.5, 1.0, 1.5, 2.0, 2.5, or 3 atmospheres (atm). The disclosed methods optionally do not increase the pressure inside the reservoir by more than 10%, 20%, 30%, 40%, or 50%.

In certain embodiments, the pressure inside the surface-accessible-hydrocarbon-product-containing portion of the reservoir is less than 5,000 pounds per square inch (psi) such as less than 4,000 psi, 3,000 psi, 2,000 psi, 1,000 psi, 900 psi, 800 psi, 700 psi, 600 psi, 500 psi, 400 psi, 300 psi, 250 psi, 200 psi, 150 psi, 100 psi, 90 psi, or 80 psi. In certain embodiments, the pressure inside the surface-accessible-hydrocarbon-product-containing portion of the reservoir is less than 500 atmospheres (atm) such as less than 400 atm, 300 atm, 200 atm, 100 atm, 90 atm, 80 atm, 70 atm, 60 atm, 50 atm, 40 atm, 30 atm, 20 atm, 10 atm, 9 atm, 8 atm, 7 atm, 6 atm, or 5 atm. The phrase "surface-accessible-hydrocarbon-product-containing portion of the reservoir" refers to the region of the reservoir in which the hydrocarbon product is displaced.

Various aspects of the disclosure relate to a foam composition as presently described. The foam may be located within a subterranean reservoir or a wellbore in communication with such a reservoir.

An example foam may include water; surfactants dissolved in the water at a concentration of 100 mg/L to 10 g/L; inorganic ions dissolved in the water at a total concentration of 3 g/L to 9 g/L; sodium cation dissolved in the water at a concentration of 500 mg/L to 4 g/L; chloride anion dissolved in the water at a concentration of 1 g/L to 7 g/L; sulfate anion dissolved in the water at a concentration of 250 mg/L to 1 g/L; magnesium cation dissolved in the water at a concentration of 100 mg/L to 500 mg/L; and pockets of gas within the water.

EXAMPLES

The following examples illustrate additional features of the present disclosure. These examples do not limit the scope of the disclosure or the appended claims.

Example 1

Comparison Between a Foam Including an Aqueous Liquid as Presently Disclosed and a Foam Produced from Seawater Tailored water was prepared as set forth in Table 1.

TABLE 1

Ion Concentrations of Tailored Water and the Observed Concentrations of the Same Ions Found in Seawater

| Ions | Symbol | Seawater concentration (ppm) | Tailored Water concentration (ppm) |
|---|---|---|---|
| Sodium | $Na^+$ | 18,300 | 1,824 |
| Calcium | $Ca^{2+}$ | 650 | 65 |
| Magnesium | $Mg^{2+}$ | 2,110 | 211 |
| Sulfate | $SO_4^{2-}$ | 4,290 | 429 |
| Chloride | $Cl^-$ | 32,200 | 3,220 |
| Bicarbonate | $HCO_3^-$ | 120 | 12 |
| Total Dissolved Solids | | 57,670 | 5,761 |
| Ionic Strength (mole/L) | | 1.146 | 0.115 |

The term "ppm" is an abbreviation for parts per million by weight, which corresponds to milligrams per kilogram. The term "mole/L" is an abbreviation for moles per liter.

Foams were prepared using 0.5% by weight surfactant in either seawater or the tailored water at 50% quality, which means that 50% of the volume of each foam was gas. The ion concentrations of the aqueous phase of each foam including tailored water was approximately equal to the tailored water ion concentrations set forth in Table 1. Surfactants were selected from AMMONYX® LMDO (Stepan Company, Illinois), which contains lauramidopropylamine oxide and myristamidopropylamine oxide, PETROSTEP® SB (Stepan Company, Illinois), which contains cocamidopropyl hydroxysultaine, and an undisclosed commercial foaming agent containing an amphoteric alkyl amine.

Foams were produced by injecting into a foam rheometer cell an aqueous composition including (1) surfactants and (2) either (a) seawater or (b) an aqueous liquid including the ion concentrations of the tailored water set forth in Table 1. Gas was then injected into the system at 80 pounds per square inch (psi) at room temperature (21±1° C.). The mixture of the aqueous composition and gas was then sheared in a foam generator at a 200 s$^{-1}$ shear rate and 80 psi at room temperature (21±1° C.). Shear time for foam production is surfactant dependent. Foams generated using an amphoteric alkyl amine, AMMONYX® LMDO, and PETROSTEP® SB were produced after 3, 10, and 20 minutes of shear time, respectively.

The term "° C." refers to degrees Celsius.

Foam lifetimes were then monitored at a constant pressure of 80 psi and at room temperature (21±1° C.). Foam lifetime by definition is the time between the end of foam generation (shearing) and the complete collapse of a foam as observed in a view cell such that foam can no longer be observed in the view cell.

Figure 1A:
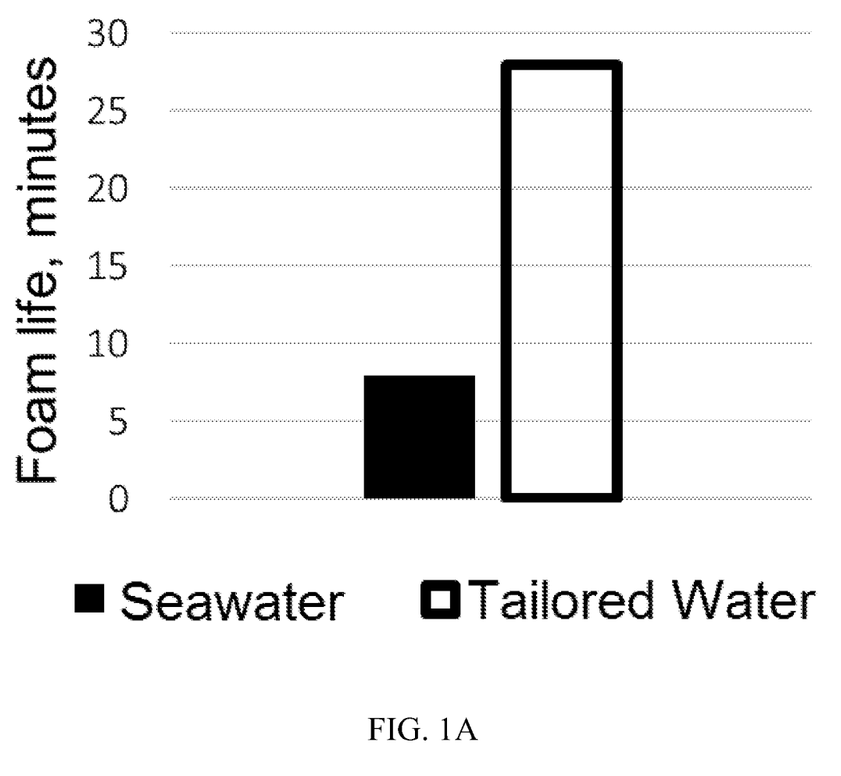
FIG. 1A is a graph depicting the lifetime of a foam produced by combining either seawater or the tailored water described in Table 1 and 0.5% by weight of a commercial foaming agent including an amphoteric alkyl amine after three minutes of shearing at 200 per second ($s^{-1}$) and 80 pounds per square inch (psi). The lifetime of the foam prepared from the tailored water was more than 300% longer than the lifetime of the foam prepared from seawater in this experiment.
Figure 1B:
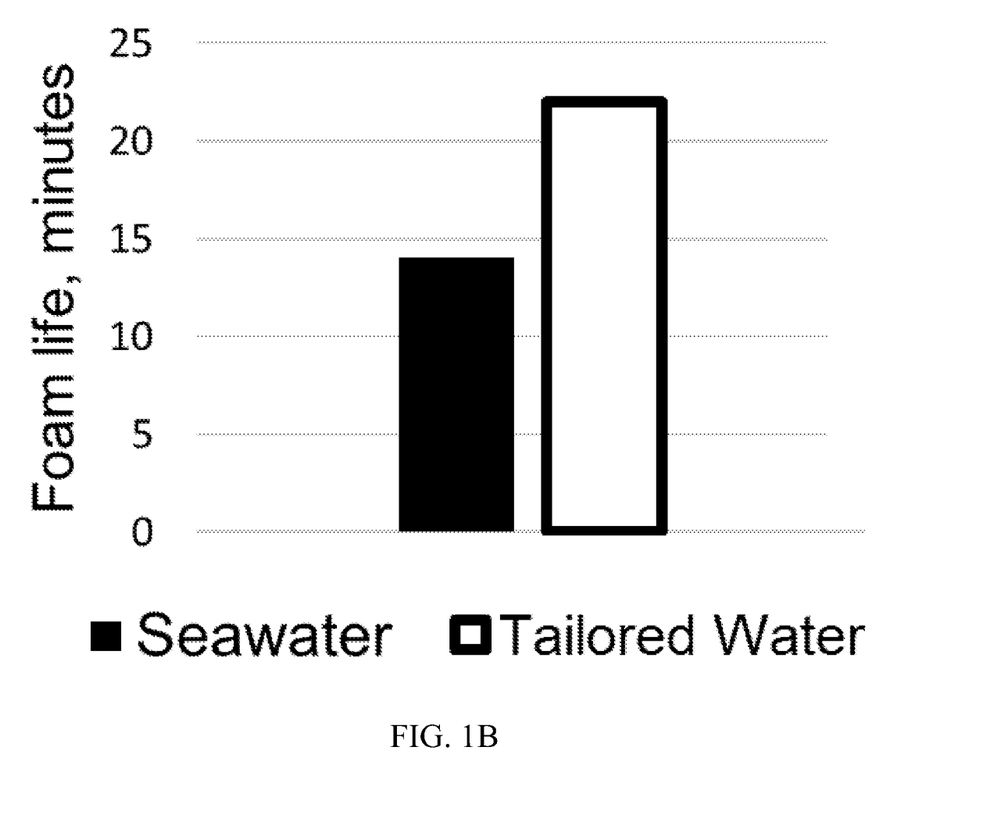
FIG. 1B is a graph depicting the lifetime of a foam produced by combining either seawater or the tailored water described in Table 1 and 0.5% by weight of AMMONYX® LMDO after ten minutes of shearing at 200 $s^{-1}$ and 80 psi. The lifetime of the foam prepared from the tailored water was more than 40% longer than the lifetime of the foam prepared from seawater in this experiment.
Figure 1C:
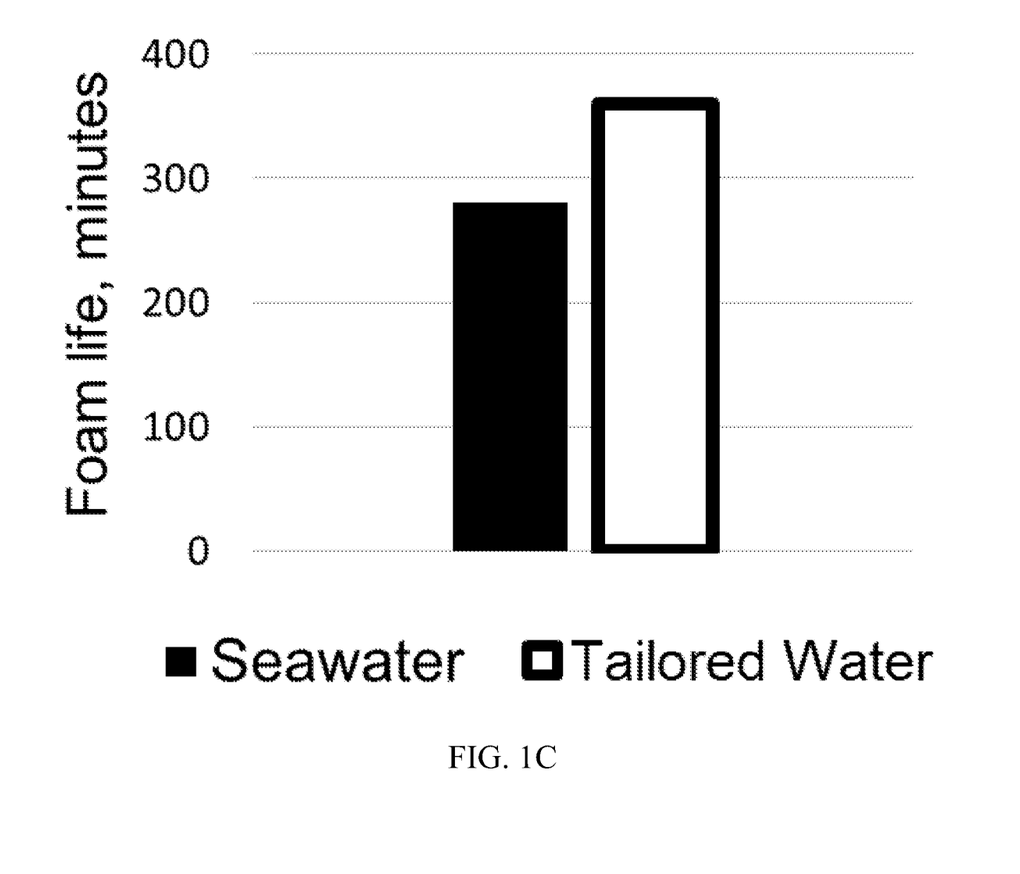
FIG. 1C is a graph depicting the lifetime of a foam produced by combining either seawater or the tailored water described in Table 1 and 0.5% by weight of PETROSTEP® SB after twenty minutes of shearing at 200 $s^{-1}$ and 80 psi. The lifetime of the foam prepared from the tailored water was more than 20% longer than the lifetime of the foam prepared from seawater in this experiment.
Figure 2:
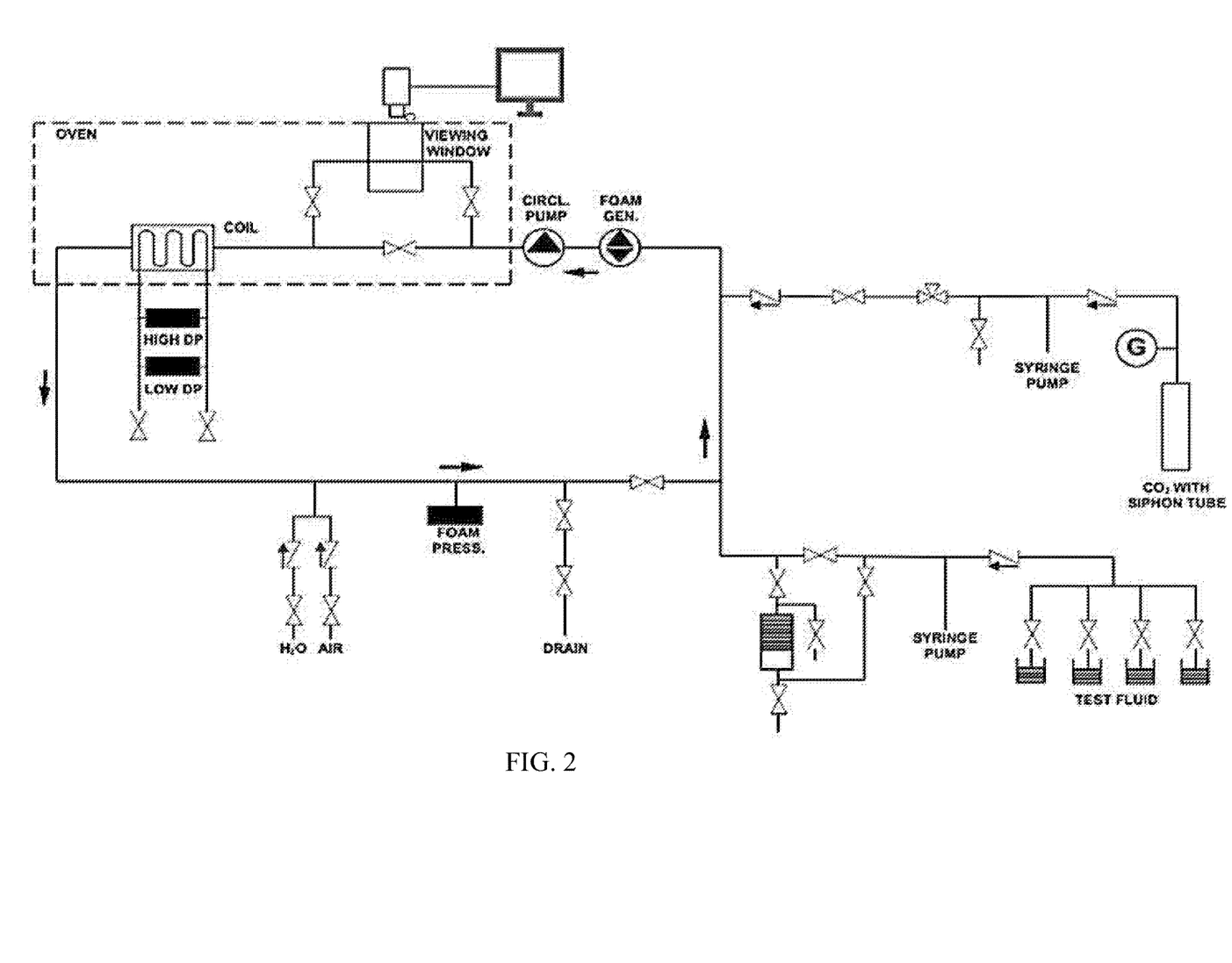
FIG. 2 is a schematic diagram of a rheometer apparatus used to assess the robustness of the foams presently described.

Representative comparisons between foams generated with either the seawater or the tailored water of Table 1 are shown in FIG. 1A-1C. A schematic diagram of the foam rheometer apparatus is shown in FIG. 2. This apparatus was used to ensure reproducibility and to approximate the production conditions of foams in industrial applications.

Foams prepared with PETROSTEP® SB displayed superior performance than all other foams. Foams prepared with seawater and PETROSTEP® SB nevertheless displayed marked degradation after 200 minutes such that the foam could not appreciably displace a hydrocarbon product. Foams prepared with tailored water and PETROSTEP® SB displayed less degradation after 200 minutes than the foam prepared with seawater, and the foam prepared with tailored water remained robust enough to displace a hydrocarbon product even after 200 minutes.

FIGS. 1A-1C demonstrate that foams generated using tailored water have longer lifetimes than foams generated using seawater. Each of three amphoteric surfactants including amine oxide surfactants, hydroxysultaine surfactants, and amphoteric alkyl amine surfactants displayed improved performance in combination with the tailored water relative to seawater, which strongly suggests that the presently disclosed inorganic ion concentrations are optimal for producing foams using generic amphoteric surfactants at least when using low surfactant concentrations (surfactant concentrations less than or equal to 1% weight/volume).

Example 2

Representative Compositions

Representative solute concentrations of the aqueous liquid of a foam are disclosed in Table 2, including sodium, chloride, magnesium, sulfate, total inorganic ion, and surfactant concentrations. The aqueous liquid may further include other ions including calcium and bicarbonate. The surfactants can be selected, for example, from any amphoteric surfactant such as N-alkyl amine oxide surfactants, hydroxysultaine surfactants, and N-alkyl betaine surfactants.

TABLE 2

Concentrations of Various Solutes in the Aqueous Liquid of Different Foams

|  | $Na^+$ (g/L) | $Cl^-$ (g/L) | $Mg^{2+}$ (mg/L) | $SO_4^{2-}$ (mg/L) | Inorganic Ions (g/L) | Surfactants (mg/L) |
|---|---|---|---|---|---|---|
| 1 | 0.1-10 | 0.2-20 | 10-1,000 | 10-2,000 | 0.5-25 | 200-10,000 |
| 2 | 0.4-4.0 | 0.2-20 | 10-1,000 | 10-2,000 | 0.5-15 | 200-10,000 |
| 3 | 1.5-2.9 | 0.2-20 | 10-1,000 | 10-2,000 | 2.0-10 | 200-10,000 |
| 4 | 0.1-10 | 0.5-10 | 10-1,000 | 10-2,000 | 0.5-15 | 200-10,000 |
| 5 | 0.4-4.0 | 0.5-10 | 10-1,000 | 10-2,000 | 1.0-9.0 | 200-10,000 |
| 6 | 1.5-2.9 | 0.5-10 | 10-1,000 | 10-2,000 | 2.0-9.0 | 200-10,000 |
| 7 | 0.1-10 | 3.0-4.4 | 10-1,000 | 10-2,000 | 4.0-15 | 200-10,000 |
| 8 | 0.4-4.0 | 3.0-4.4 | 10-1,000 | 10-2,000 | 4.0-9.0 | 200-10,000 |
| 9 | 1.5-2.9 | 3.0-4.4 | 10-1,000 | 10-2,000 | 5.0-9.0 | 200-10,000 |
| 10 | 0.1-10 | 0.2-20 | 150-300 | 10-2,000 | 0.5-25 | 200-10,000 |
| 11 | 0.4-4.0 | 0.2-20 | 150-300 | 10-2,000 | 0.5-15 | 200-10,000 |
| 12 | 1.5-2.9 | 0.2-20 | 150-300 | 10-2,000 | 2.0-10 | 200-10,000 |
| 13 | 0.1-10 | 0.5-10 | 150-300 | 10-2,000 | 0.5-15 | 200-10,000 |
| 14 | 0.4-4.0 | 0.5-10 | 150-300 | 10-2,000 | 1.0-9.0 | 200-10,000 |
| 15 | 1.5-2.9 | 0.5-10 | 150-300 | 10-2,000 | 2.0-9.0 | 200-10,000 |
| 16 | 0.1-10 | 3.0-4.4 | 150-300 | 10-2,000 | 4.0-15 | 200-10,000 |
| 17 | 0.4-4.0 | 3.0-4.4 | 150-300 | 10-2,000 | 4.0-9.0 | 200-10,000 |
| 18 | 1.5-2.9 | 3.0-4.4 | 150-300 | 10-2,000 | 5.0-9.0 | 200-10,000 |
| 19 | 0.1-10 | 0.2-20 | 10-1,000 | 300-600 | 0.5-25 | 200-10,000 |
| 20 | 0.4-4.0 | 0.2-20 | 10-1,000 | 300-600 | 0.5-15 | 200-10,000 |
| 21 | 1.5-2.9 | 0.2-20 | 10-1,000 | 300-600 | 2.0-10 | 200-10,000 |
| 22 | 0.1-10 | 0.5-10 | 10-1,000 | 300-600 | 0.5-15 | 200-10,000 |
| 23 | 0.4-4.0 | 0.5-10 | 10-1,000 | 300-600 | 1.0-9.0 | 200-10,000 |
| 24 | 1.5-2.9 | 0.5-10 | 10-1,000 | 300-600 | 2.0-9.0 | 200-10,000 |
| 25 | 0.1-10 | 3.0-4.4 | 10-1,000 | 300-600 | 4.0-15 | 200-10,000 |
| 26 | 0.4-4.0 | 3.0-4.4 | 10-1,000 | 300-600 | 4.0-9.0 | 200-10,000 |
| 27 | 1.5-2.9 | 3.0-4.4 | 10-1,000 | 300-600 | 5.0-9.0 | 200-10,000 |
| 28 | 0.1-10 | 0.2-20 | 150-300 | 300-600 | 0.5-25 | 200-10,000 |
| 29 | 0.4-4.0 | 0.2-20 | 150-300 | 300-600 | 0.5-15 | 200-10,000 |

TABLE 2-continued

Concentrations of Various Solutes in the Aqueous Liquid of Different Foams

|    | $Na^+$ (g/L) | $Cl^-$ (g/L) | $Mg^{2+}$ (mg/L) | $SO_4^{2-}$ (mg/L) | Inorganic Ions (g/L) | Surfactants (mg/L) |
|----|---------|---------|-----------|------------|----------------|-------------|
| 30 | 1.5-2.9 | 0.2-20  | 150-300   | 300-600    | 2.0-10         | 200-10,000  |
| 31 | 0.1-10  | 0.5-10  | 150-300   | 300-600    | 0.5-15         | 200-10,000  |
| 32 | 0.4-4.0 | 0.5-10  | 150-300   | 300-600    | 1.0-9.0        | 200-10,000  |
| 33 | 1.5-2.9 | 0.5-10  | 150-300   | 300-600    | 2.0-9.0        | 200-10,000  |
| 34 | 0.1-10  | 3.0-4.4 | 150-300   | 300-600    | 4.0-15         | 200-10,000  |
| 35 | 0.4-4.0 | 3.0-4.4 | 150-300   | 300-600    | 4.0-9.0        | 200-10,000  |
| 36 | 1.5-2.9 | 3.0-4.4 | 150-300   | 300-600    | 5.0-9.0        | 200-10,000  |
| 37 | 0.1-10  | 0.2-20  | 10-1,000  | 10-2,000   | 0.5-25         | 500-8,000   |
| 38 | 0.4-4.0 | 0.2-20  | 10-1,000  | 10-2,000   | 0.5-15         | 500-8,000   |
| 39 | 1.5-2.9 | 0.2-20  | 10-1,000  | 10-2,000   | 2.0-10         | 500-8,000   |
| 40 | 0.1-10  | 0.5-10  | 10-1,000  | 10-2,000   | 0.5-15         | 500-8,000   |
| 41 | 0.4-4.0 | 0.5-10  | 10-1,000  | 10-2,000   | 1.0-9.0        | 500-8,000   |
| 42 | 1.5-2.9 | 0.5-10  | 10-1,000  | 10-2,000   | 2.0-9.0        | 500-8,000   |
| 43 | 0.1-10  | 3.0-4.4 | 10-1,000  | 10-2,000   | 4.0-15         | 500-8,000   |
| 44 | 0.4-4.0 | 3.0-4.4 | 10-1,000  | 10-2,000   | 4.0-9.0        | 500-8,000   |
| 45 | 1.5-2.9 | 3.0-4.4 | 10-1,000  | 10-2,000   | 5.0-9.0        | 500-8,000   |
| 46 | 0.1-10  | 0.2-20  | 150-300   | 10-2,000   | 0.5-25         | 500-8,000   |
| 47 | 0.4-4.0 | 0.2-20  | 150-300   | 10-2,000   | 0.5-15         | 500-8,000   |
| 48 | 1.5-2.9 | 0.2-20  | 150-300   | 10-2,000   | 2.0-10         | 500-8,000   |
| 49 | 0.1-10  | 0.5-10  | 150-300   | 10-2,000   | 0.5-15         | 500-8,000   |
| 50 | 0.4-4.0 | 0.5-10  | 150-300   | 10-2,000   | 1.0-9.0        | 500-8,000   |
| 51 | 1.5-2.9 | 0.5-10  | 150-300   | 10-2,000   | 2.0-9.0        | 500-8,000   |
| 52 | 0.1-10  | 3.0-4.4 | 150-300   | 10-2,000   | 4.0-15         | 500-8,000   |
| 53 | 0.4-4.0 | 3.0-4.4 | 150-300   | 10-2,000   | 4.0-9.0        | 500-8,000   |
| 54 | 1.5-2.9 | 3.0-4.4 | 150-300   | 10-2,000   | 5.0-9.0        | 500-8,000   |
| 55 | 0.1-10  | 0.2-20  | 10-1,000  | 300-600    | 0.5-25         | 500-8,000   |
| 56 | 0.4-4.0 | 0.2-20  | 10-1,000  | 300-600    | 0.5-15         | 500-8,000   |
| 57 | 1.5-2.9 | 0.2-20  | 10-1,000  | 300-600    | 2.0-10         | 500-8,000   |
| 58 | 0.1-10  | 0.5-10  | 10-1,000  | 300-600    | 0.5-15         | 500-8,000   |
| 59 | 0.4-4.0 | 0.5-10  | 10-1,000  | 300-600    | 1.0-9.0        | 500-8,000   |
| 60 | 1.5-2.9 | 0.5-10  | 10-1,000  | 300-600    | 2.0-9.0        | 500-8,000   |
| 61 | 0.1-10  | 3.0-4.4 | 10-1,000  | 300-600    | 4.0-15         | 500-8,000   |
| 62 | 0.4-4.0 | 3.0-4.4 | 10-1,000  | 300-600    | 4.0-9.0        | 500-8,000   |
| 63 | 1.5-2.9 | 3.0-4.4 | 10-1,000  | 300-600    | 5.0-9.0        | 500-8,000   |
| 64 | 0.1-10  | 0.2-20  | 150-300   | 300-600    | 0.5-25         | 500-8,000   |
| 65 | 0.4-4.0 | 0.2-20  | 150-300   | 300-600    | 0.5-15         | 500-8,000   |
| 66 | 1.5-2.9 | 0.2-20  | 150-300   | 300-600    | 2.0-10         | 500-8,000   |
| 67 | 0.1-10  | 0.5-10  | 150-300   | 300-600    | 0.5-15         | 500-8,000   |
| 68 | 0.4-4.0 | 0.5-10  | 150-300   | 300-600    | 1.0-9.0        | 500-8,000   |
| 69 | 1.5-2.9 | 0.5-10  | 150-300   | 300-600    | 2.0-9.0        | 500-8,000   |
| 70 | 0.1-10  | 3.0-4.4 | 150-300   | 300-600    | 4.0-15         | 500-8,000   |
| 71 | 0.4-4.0 | 3.0-4.4 | 150-300   | 300-600    | 4.0-9.0        | 500-8,000   |
| 72 | 1.5-2.9 | 3.0-4.4 | 150-300   | 300-600    | 5.0-8.0        | 500-8,000   |

According to a first aspect of the present disclosure, a method of extracting a hydrocarbon product from a reservoir is disclosed. The method includes combining an aqueous liquid and a gas vehicle, thereby producing a foam; introducing the foam to the reservoir such that the hydrocarbon product in the reservoir is displaced; and collecting the displaced hydrocarbon product. The aqueous liquid includes inorganic ions at a total concentration of 1 g/L to 9 g/L; the aqueous liquid includes surfactants at a total concentration of 100 mg/L to 10 g/L; the aqueous liquid includes total dissolved solids at a concentration of 2 g/L to 20 g/L; and the density of the foam at atmospheric pressure is 100 g/L to 750 g/L.

A second aspect of the present disclosure may include the first aspect, in which the aqueous liquid includes inorganic ions at a total concentration of 5 g/L to 8 g/L.

A third aspect of the present disclosure may include the first aspect or the second aspect, in which the aqueous liquid includes: sodium cation at a concentration of at least 500 mg/L; chloride anion at a concentration of at least 1 g/L; magnesium cation at a concentration of at least 100 mg/L; or sulfate anion at a concentration of at least 250 mg/L.

A fourth aspect of the present disclosure may include any of the first through third aspects, in which the aqueous liquid includes: sodium cation at a concentration of at least 500 mg/L; chloride anion at a concentration of at least 1 g/L; magnesium cation at a concentration of at least 100 mg/L; and sulfate anion at a concentration of at least 250 mg/L.

A fifth aspect of the present disclosure may include any of the first through fourth aspects, in which the aqueous liquid includes: sodium cation at a concentration of 1 g/L to 4 g/L; chloride anion at a concentration of 2 g/L to 5 g/L; magnesium cation at a concentration of 150 mg/L to 300 mg/L; and sulfate anion at a concentration of 300 mg/L to 600 mg/L.

A sixth aspect of the present disclosure may include any of the first through fifth aspects, in which the aqueous liquid includes calcium cation at a concentration of 50 mg/L to 100 mg/L.

A seventh aspect of the present disclosure may include any of the first through sixth aspects, in which the surfactants include one or more amphoteric surfactants.

An eighth aspect of the present disclosure may include any of the first through seventh aspects, in which the surfactants include one or more anionic, cationic, or non-ionic surfactants.

A ninth aspect of the present disclosure may include any of the first through eighth aspects, in which the surfactants include one or more N-alkyl amine oxide surfactants.

A tenth aspect of the present disclosure may include any of the first through ninth aspects, in which the surfactants include one or more amphoteric alkyl amine surfactants.

An eleventh aspect of the present disclosure may include any of the first through tenth aspects, in which the surfactants include one or more hydroxysultaine surfactants.

A twelfth aspect of the present disclosure may include any of the first through eleventh aspects, in which the surfactants include one or more of lauramidopropylamine oxide, myristamidopropylamine oxide, and cocamidopropyl hydroxysultaine.

A thirteenth aspect of the present disclosure may include any of the first through twelfth aspects, in which the aspect further includes combining a tailored water with the surfactants, thereby producing the aqueous liquid, in which the tailored water includes inorganic ions at a concentration of at least 1 g/L.

A fourteenth aspect of the present disclosure may include any of the first through thirteenth aspects, in which the aspect further includes combining seawater and an aqueous vehicle, thereby producing the tailored water.

A fifteenth aspect of the present disclosure may include any of the first through fourteenth aspects, in which the aqueous vehicle is desalinated seawater, ground water, formation water, or surface water; and the seawater and aqueous vehicle are combined at a ratio (volume:volume) of 1:5 to 1:20.

A sixteenth aspect of the present disclosure may include any of the first through fifteenth aspects, in which the seawater and aqueous vehicle are combined at a ratio (volume:volume) of 1:7 to 1:15.

A seventeenth aspect of the present disclosure may include any of the first through sixteenth aspects, in which the aspect further includes pumping the aqueous liquid into the reservoir; or pumping the foam into the reservoir.

An eighteenth aspect of the present disclosure may include any of the first through seventeenth aspects, in which the gas vehicle includes air, nitrogen, or carbon dioxide at a total concentration of at least 70% by volume.

A nineteenth aspect of the present disclosure may include any of the first through eighteenth aspects, in which the reservoir is an underground rock formation including crude oil or natural gas.

According to a twentieth aspect of the present disclosure, a foam composition includes an aqueous liquid and pockets of gas within the aqueous liquid, in which: the aqueous liquid includes sodium cation at a concentration of 1 g/L to 4 g/L; the aqueous liquid includes chloride anion at a concentration of 2 g/L to 5 g/L; the aqueous liquid includes magnesium cation at a concentration of 150 mg/L to 300 mg/L; the aqueous liquid includes sulfate anion at a concentration of 300 mg/L to 600 mg/L; the aqueous liquid includes calcium cation at a concentration of 50 mg/L to 100 mg/L; the aqueous liquid includes inorganic ions at a total concentration of 5 g/L to 8 g/L; the aqueous liquid includes amphoteric surfactants at a total concentration of 100 mg/L to 10 g/L; the aqueous liquid includes total dissolved solids at a concentration of 6 g/L to 18 g/L; and the density of the foam at atmospheric pressure is 100 g/L to 750 g/L.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in an example or table included within the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. The specification therefore covers the modifications and variations of the various described embodiments provided that such modifications and variations fall within the scope of the appended claims and their equivalents.

What is claimed is:

1. A method of extracting a hydrocarbon product from a reservoir, comprising:
   combining an aqueous liquid and a gas vehicle, thereby producing a foam;
   introducing the foam to the reservoir such that the hydrocarbon product in the reservoir is displaced; and
   collecting the displaced hydrocarbon product, where:
   the aqueous liquid comprises inorganic ions at a total concentration of 1 g/L to 9 g/L;
   the aqueous liquid comprises one or more hydroxysultaine surfactants at a total concentration of 100 mg/L to 10 g/L;
   the aqueous liquid comprises total dissolved solids at a concentration of 2 g/L to 20g/L; and
   the density of the foam at atmospheric pressure is 100 g/L to 750 g/L.

2. The method of claim 1, in which the aqueous liquid comprises inorganic ions at a total concentration of 5 g/L to 8 g/L.

3. The method of claim 1, in which the aqueous liquid comprises:
   sodium cation at a concentration of at least 500 mg/L;
   chloride anion at a concentration of at least 1 g/L;
   magnesium cation at a concentration of at least 100 mg/L; or
   sulfate anion at a concentration of at least 250 mg/L.

4. The method of claim 1, in which the aqueous liquid comprises:
   sodium cation at a concentration of at least 500 mg/L;
   chloride anion at a concentration of at least 1 g/L;
   magnesium cation at a concentration of at least 100 mg/L; and
   sulfate anion at a concentration of at least 250 mg/L.

5. The method of claim 1, in which the aqueous liquid comprises:
   sodium cation at a concentration of 1 g/L to 4 g/L;
   chloride anion at a concentration of 2 g/L to 5 g/L;
   magnesium cation at a concentration of 150 mg/L to 300 mg/L; and
   sulfate anion at a concentration of 300 mg/L to 600 mg/L.

6. The method of claim 1, in which the aqueous liquid comprises calcium cation at a concentration of 50 mg/L to 100 mg/L.

7. The method of claim 1, in which the aqueous liquid further includes one or more amphoteric surfactants.

8. The method of claim 1, in which the aqueous liquid further includes one or more anionic, cationic, or nonionic surfactants.

9. The method of claim 1, in which the aqueous liquid further includes one or more N-alkyl amine oxide surfactants.

10. The method of claim 1, in which the aqueous liquid further includes one or more amphoteric alkyl amine surfactants.

11. The method of claim 1, in which the aqueous liquid further includes one or more of lauramidopropylamine oxide, myristamidopropylamine oxide, and cocamidopropyl hydroxysultaine.

12. The method of claim 1, further comprising combining a tailored water with the surfactants, thereby producing the aqueous liquid, in which the tailored water comprises inorganic ions at a concentration of at least 1 g/L.

13. The method of claim 12, further comprising combining seawater and an aqueous vehicle, thereby producing the tailored water.

14. The method of claim 13, in which:
the aqueous vehicle is desalinated seawater, ground water, formation water, or surface water; and
the seawater and aqueous vehicle are combined at a ratio (volume:volume) of 1:5 to 1:20.

15. The method of claim 14, in which the seawater and aqueous vehicle are combined at a ratio (volume:volume) of 1:7 to 1:15.

16. The method of claim 1, further comprising:
pumping the aqueous liquid into the reservoir; or
pumping the foam into the reservoir.

17. The method of claim 1, in which the gas vehicle comprises air, nitrogen, or carbon dioxide at a total concentration of at least 70% by volume.

18. The method of claim 1, in which the reservoir is an underground rock formation comprising crude oil or natural gas.

* * * * *